United States Patent [19]

Drees et al.

[11] 3,806,902

[45] Apr. 23, 1974

[54] MAGNETIC HEAD READ-TO-WRITE GAP CROSSFEED SHIELDING

[75] Inventors: Michael J. Drees, New Brighton; Matthias J. Grundtner, St. Paul, both of Minn.

[73] Assignee: Nortronics Company, Inc., Minneapolis, Minn.

[22] Filed: May 15, 1972

[21] Appl. No.: 252,988

[52] U.S. Cl. .................... 360/129, 360/121

[51] Int. Cl. .................... G11b 5/28

[58] Field of Search ....... 340/174.1 F; 179/100.2 C; 346/74 MC

[56] References Cited

UNITED STATES PATENTS

| | | | |
|---|---|---|---|
| 3,610,839 | 10/1971 | Sand | 179/100.2 C |
| 3,064,333 | 11/1962 | Kristiansen et al. | 179/100.2 C |
| 2,922,231 | 1/1960 | Witt et al. | 179/100.2 C |
| 3,249,928 | 5/1966 | Curtis et al. | 340/174.1 F |
| 3,551,609 | 2/1970 | Libby | 340/174.1 F |
| 3,526,885 | 9/1970 | Anderson | 340/174.1 F |
| 3,479,663 | 11/1969 | Morrison et al. | 240/174.1 F |
| 3,412,216 | 11/1968 | Rosado et al. | 340/174.1 F |
| 3,603,941 | 9/1971 | Koorneat | 340/174.1 F |
| 3,684,839 | 8/1972 | KoHomma | 340/174.1 F |

*Primary Examiner*—Vincent P. Canney
*Attorney, Agent, or Firm*—Merchant, Gould, Smith & Edell

[57] ABSTRACT

A read-after-write magnetic head with stray flux absorbing shielding is disclosed. The shielding includes a write side shielding which forms a magnetic circuit surrounding the write side of the magnetic head for gathering stray magnetic flux emitted from the write side thus preventing this stray flux from reaching the read side of the magnetic head. The read side of the magnetic head contains shielding for gathering any stray flux which has reached the read side from the write side and for bridging some of this stray flux back to the shielding on the write side of the magnetic head.

7 Claims, 4 Drawing Figures

MAGNETIC HEAD READ-TO-WRITE GAP CROSSFEED SHIELDING

BACKGROUND OF THE INVENTION

1. Field of the Invention

This invention relates generally to magnetic transducers and more particularly relates to a structure for a read-after-write magnetic head having improved means for reducing flux leakage between circuits.

2. Description of the Prior Art

Read-after-write magnetic heads are used in computer peripherals such as data acquisition, data storage, data retrieval and others to record statistical or other information on magnetic tape in one of the many binary data codes. These heads may have one or more channels, with each channel having rather closely spaced, parallel read and write gaps. Each gap is formed by a pair of core pieces forming a magnetic flux circuit with a coil mounted on one core piece of each circuit. The input to the write coil is a digital electrical signal comprising a series of pulses. As the magnetic tape passes over the head, the write gaps record information on the tape. Immediately after the recording step, the tape passes over the read gap where the recorded information is picked up and reproduced in order to check the accuracy of the recording. The read and write functions are carried on simultaneously by the heads so that the accuracy of the written data can be verified without stopping the writing process.

Because of the extremely close proximity of the read and write circuits, and because of the relatively high current flow through the write coil, the write signal tends to be fed over and picked up by the read circuit. This coupling is known as cross-feed. If this coupling between the read and write portions of the head, caused by leakage flux, is too high, the output of the read head may become meaningless. In other words, the signal induced in the read circuit by the leakage flux from the write circuit may be large enough to mask the signal being picked up from the tape. This problem has heretofore been dealt with by the use of a cross-feed shield located external to and in front of the head's face. This cross-feed shield is usually referred to as a flux gate. Generally, it is located between eight and 10 thousandths of an inch from the face of the magnetic head. Because of this close proximity, the flux gate creates a hinderance to loading the tape. Additionally, the flux gate must be adjusted whenever a head is changed as even the same type of heads are of varying sizes.

SUMMARY OF THE INVENTION

In accordance with the invention, a new and unique construction of a read-after-write magnetic head is provided for reducing flux leakage between read and write circuits. Within a read-after-write magnetic head having a write circuit with an inside core piece and an outside core piece, said pieces defining a write gap, and a read circuit having an inside core piece and an outside core piece, said core pieces defining a read gap, a flank shield constructed of a highly permeable material is located exterior of the write gap for gathering stray flux which may be emitted while not interfering with the signal at the write gap. A pair of spaced apart end shields constructed of a highly permeable material are located between and in contact with the flank shield and a cross-feed shield. A complete stray flux absorbing circuit surrounding the write circuit is thus provided consisting of the end shields, the cross-feed shield, and the flank shield. Additionally, for multi-channel heads, the use of cross-talk shields between write circuits not only reduces cross-talk between channels but also serves to absorb flux which would be absorbed at the read circuits of the head.

The magnetic head also contains a read side shield which surrounds the read side circuits to provide a large flux gathering area for absorbing stray flux which has escaped from the write side of the magnetic head. The read side shielding is not a continuous circuit and consequently flux which the read side shielding has gathered tends to bridge back to the write side of the magnetic head.

DETAILED DESCRIPTION OF THE PREFERRED EMBODIMENT

Figures 1, 2, 3, 4:
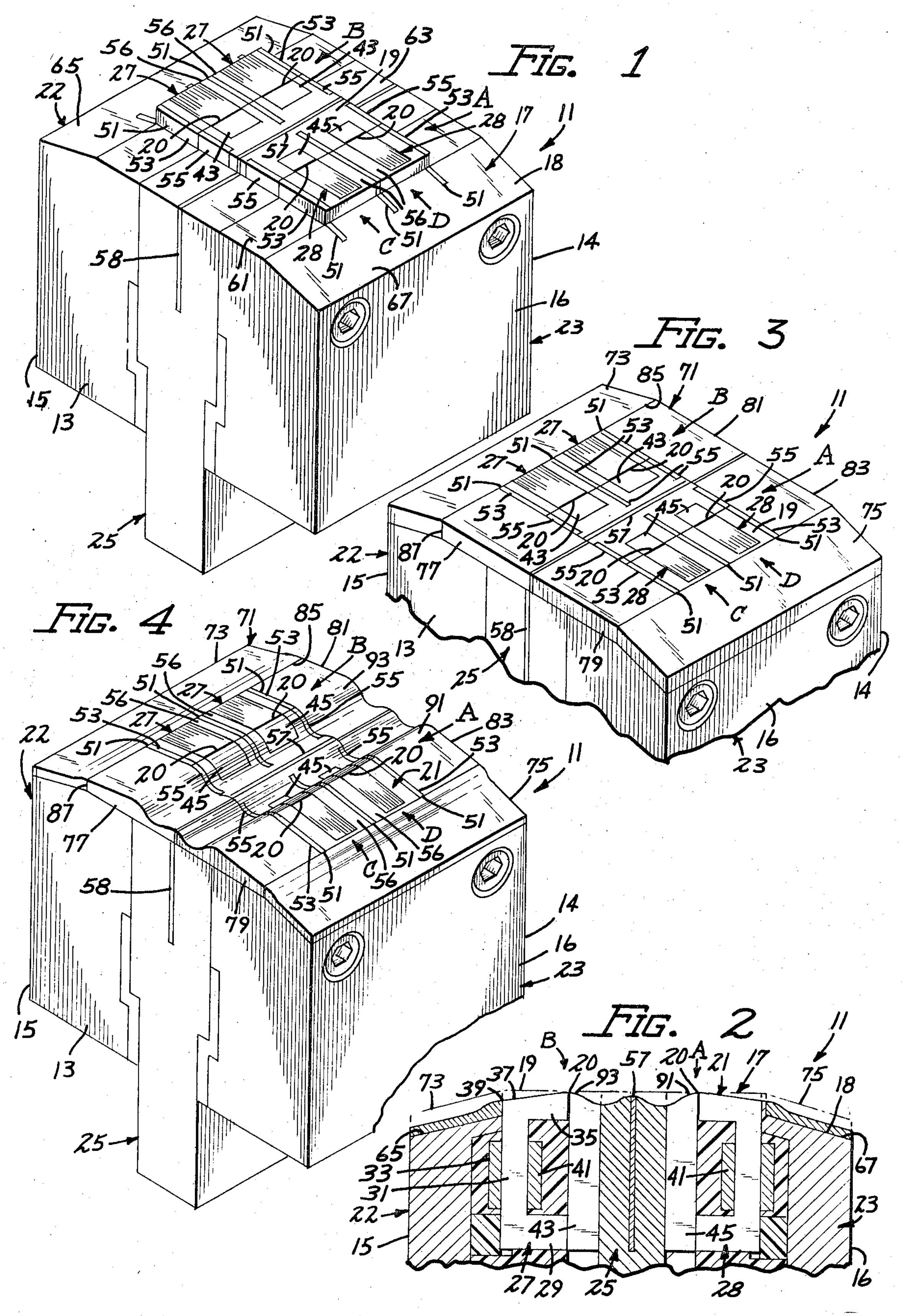
FIG. 1 is a view in perspective of a two-channel read-after-write magnetic head prior to the addition of flux gathering shielding.
FIG. 2 is a partial cross-sectional view of the read-after-write magnetic head showing the initial configuration of the face of the magnetic head shown in FIG. 1 and the final configuration of the face of the magnetic head as shown in FIG. 4.
FIG. 3 is a partial view in perspective of the face of the magnetic head with flux gathering shielding attached.
FIG. 4 is a view in perspective of the magnetic head of the present invention after the face has been contoured to a final configuration.

In the drawings, like numerals will be used throughout the several views to indicate like elements of the invention. Referring first to FIG. 1, a magnetic transducer 11 having a generally box-like configuration is shown. Transducer 11 has a forward end wall 13, a rearward end wall 14, a write side wall 15, a read side wall 16, and a face 17. Face 17 has a base portion 18 and a raised rectangular portion 19 located approximately in the center of portion 18. This particular magnetic head is a two-channel read-after-write magnetic head with the read circuit side designated A and the write circuit side designated B. Gaps 20 in each of the circuits are shown in spaced apart longitudinally extending coplanar relationship along each of the read and write sides of the magnetic head. Each write gap 20 provides a channel of information to a tape as the tape is drawn across the magnetic head face, and each read gap 20 obtains a channel of information from the tape.

As mentioned, the read-after-write magnetic head shown in FIG. 1 is a two-channel type. The channels are designated C and D. When a tape is drawn across the magnetic transducer 11 the write side B of the transducer provides two channels of information, C and D, to the tape and then as the tape reaches the read side A of the transducer 11 both of the channels C and D receive the information which was deposited on the tape.

Referring now additionally to FIG. 2 which shows the initial face 17 as shown in FIG. 1 and also the final tape engaging face 21 as shown in FIG. 4, magnetic transducer 11 is generally constructed of a pair of outside core holders 22 and 23 and a center section core holder 25. The core holders 22, 23 and 25 are constructed from an electrically conductive, non-magnetic metal such as aluminum.

The write side outside core holder 22 contains a pair of C-shaped core pieces 27 and the read side core holder 23 contains a pair of C-shaped core pieces 28. Each C-shaped core piece 27 has a horizontally extending bottom leg 29, vertically extending side leg 31 having an outside vertical surface 33, and a horizontally extending top leg 35 having a final top face 37. The outside vertical surface 33 and the top face 37 define an edge 39 at their juncture. Each side leg 31 has a coil 41 wraped therearound. The center section core holder 25 contains a pair of I-shaped core pieces 43 which cooperate with the write core pieces 27 to form the write side circuit and define the gaps 20 along the write side B. The center section core holder 25 also contains a pair of I-shaped core pieces 45 which cooperate with the read core pieces 28 to form the read side circuit and define the gaps 20 along the read side A. The core pieces are constructed from a highly permeable material, such as the various metals sold under the trademark "Mu-Metal," 37 Hy-Mu 800" and others. At gap 20 a gap spacer may be provided by depositing a material or by adding a strip of foil. In the operation of the magnetic head, the tape makes contact with the final head face 21 at least at gaps 20.

A plurality of narrow cross-talk shields 51 are located in parallel spaced apart relationship between the circuits on both the read and write sides and also between the circuits and the forward wall 13 and the rearward wall 14. The cross-talk shields are generally rectangular and extend downwardly into the transducer 11 so as to shield adjacent circuits C and D in both the write side B and the read side A. Only the top surface of the cross-talk shields 51 is shown and this surface has first portions 53 which are located within the outside core holders 22 and 23 and second portions 55 which are located within the center core holder 25. The cross-talk shields 51 are constructed of "Mu-Metal" or any other highly permeable material such as ferrite. When the magnetic head is of a multi-channel nature, having perhaps nine channels. the cross-talk shields may be laminated "Mu-Metal" and brass. A laminated brass cross-talk shield is necessary since when constructing a multi-channel head the aluminum material which is located between the magnetic circuits, and designated 56 for reference, must be minimized or eliminated since it takes up valuable space and the brass must then be used to perform the function of isolating the magnetic circuits from the shield's magnetic material. Generally, "Mu-Metal" is used rather than ferrite since the "Mu-Metal" is easier to work with than the harder ferrite.

A thin laminated cross-feed shield 57 is provided between the read circuits and the write circuits. The shield 57 is rectangularly shaped and extends downwardly within the transducer 11. In the drawings only the top surface and the forward edge 58 of the shield 57 is shown. We have chosen to make the cross-feed shield of a laminated ferrite and "Mu-Metal". However, as will be understood other materials may be used provided that they are of high permeability.

Generally, the magnetic head is cubically constructed, and the face 17 of the head is then ground away to the form shown in FIG. 1. However, if desirable, the head may be constructed initially as in FIG. 1. As shown, the face 17 is relieved so as to provide the base portion 18 and the raised portion 19. Base 18 includes forward side portion 61, rearward side portion 63, write flank 65 and read flank 67. In order to provide a particular wrap angle for the tape which will be used in conjunction with the head, the flanks 65 and 67 are further relieved to about 15 degrees from the horizontal.

Referring now additionally to FIG. 3, there is shown the face 17 of the magnetic head after the addition of the magnetic flux divering head after the addition of the magnetic flux divering shielding 71. Generally, shielding 71 includes a write flank shield 73, a read flank shield 75, a forward side write shield 77, a forward side read shield 79, a rearward side write shield 81, and a rearward side read shield 83. The write flank shield 73 has an edge 85 defined by the top surface of the shield and the inward side surface 87. These shields are of a ferrite material and are used because they are highly permeable, however, "Mu-Metal" could be used for the shields. We have chosen to make the various shields with a thickness of approximately 20 thousandths, however, a thickness of from between ten to sixty thousandths would certainly be acceptable. The ferrite shields are held to the base 18 of the face 17 of the magnetic transducer by means of epoxy.

It is to be noted that the edge 85 of the inwardly directed side 87 of the write flank shield 73 is at the height and proximate of the edge 39 of the top surface 37 of the core piece 27. In general, it is desired that the ferrite flank shield 73 be as close to the height of the top face 37 of the core piece 27 as possible. The write flank shield 73 is in physical contact with the forward side write shield 77 and the rearward side write shield 71, and the forward side write shield 77 and the rearward side write shield 71 are in physical contact with the cross-feed shield 57.

With respect to the read side of the magnetic head, the read flank shield 75 is in contact with the forward side read shield 79 and the rearward side shield 83. However, the forward side read shield 79 and the rearward side read shield 83 are not in contact with the forward side write shield 77 and the rearward side write shield 81, respectively, nor are they in contact with the cross-feed shield 57. The significance of the arrangement of the magnetic flux diverting shielding 71 will be appreciated upon further reading.

After the various magnetic flux shields have been secured to the base 18 of the top face 17 of the magnetic head, the face is ground so as to obtain the configuration shown in FIG. 4 with the tape-engaging face 21. As seen in FIG. 4, a first elevation 91 extends along the read gaps 20 and a second elevation 93 extends along the write gaps 20. During tape engaging operation, the tape is drawn across the magnetic head with the gaps 20 in the highest portion along the elevations 91 and 93 for contact with the tape.

To operate the head, suitable electrical pulses are supplied to each coil 41 of each circuit of the write portion B of the head causing magnetic flux to flow in each circuit defined by a C-shaped core piece and an I-core piece thus producing a suitable recording flux at each gap 20 in the write section B of the magnetic head. The intense field flux at the gaps 20 causes information to be recorded on the magnetic tape which then immediately passes over the read gaps 20. The magnetized portions of the tape passing the gaps 20 in the read section A causes a flow of magnetic flux through the read circuits in turn causing a current flow within the read circuit coil 41 which current flow is recorded in order to check the accuracy of the recording.

If the signal produced by the write portion B of the head is to be meaningful, when reproduced at the read portion A, it must not be interfered with by extraneous signals emanating from the other circuits in the head. The purpose of this invention is to use a magnetic flux diverter shielding to transport write side flux back to its source rather than to allow the flux to reach the read circuit. In order to accomplish this result the write side of the magnetic flux shielding 71 is provided for capturing stray flux and containing it within this circuit. The magnetic flux diversion is accomplished by write side flank shield 73 cooperating with cross-feed shield 57, forward side write shield 77 and rearward side write shield 81. By the use of the flux circuit created by this picture-frame shielding, any extraneous flux emitted at the write side B of the head will be gathered by the shielding thus preventing the flux from entering the read side circuits. The shield 73 is placed so that edge 85 of shield 73 is proximate the edge 39 of the C-shaped core piece 27, since the greatest flux loss occurs primarily at sharp discontinuities in a magnetic flux path. This arrangement places the shield 73 at the point of maximum efficiency for gathering stray flux emitted at edge 37 and also the stray flux which may be emitted from the write gap 20. If the particular outside core piece does not have an edge 39, then the edge 85 of the shield 73 should be located in a position as close to the gap 20 as possible for gathering stray flux but not so close that the shielding 73 interferes with the signal at the gap 20 by drawing part of the signal. Of course, the surface 87 could be at any angle with respect to the top surface of shield 73 so as to conform the shield 73 to the particular shape of the outside core piece 27. Also it is to be noted that a cover or wear surface could be placed over the shielding and that the shielding does not have to be part of the final tape-engaging face 21.

Additionally, the use of "Mu-Metal" for cross-talk shield 51 not only reduces cross-talk between channels but also serves to absorb flux which would be absorbed at the read circuits of the head.

The read flank shield 75 cooperates with the forward side read shield 79 and the rearward side read shield 83 in preventing stray flux which might have escaped the write side and arrived at the read side from entering the read circuits. The combination of shields provides a large flux gathering area which has a disportionately greater flux gathering effect on the large flux densities than on the lesser flux densities. Thus, there is a balancing effect with the shielding gathering the stray large flux densities and spreading out the flux within the shielding rather than allowing this large flux density to be gathered into a particular read circuit.

It is to be noted that the forward side read shield 79 and the rearward side read shield 83 are not in contact with the forward side write shield 77 or the rearward side shield 81. Additionally, the read side shields 79 and 83 are not in contact with the cross-feed shield 57, but they are separated by epoxy and/or air. Because of this arrangement, the read side of the shielding 71 is not in the continuous magnetic circuit defined by the write side of the shielding 71 and thus there is not a tendency for the flux which the write side of shielding 71 has gathered to flow within the read side of the magnetic head. And, since there is not a continuous magnetic circuit within the read side of the shielding 71, the stray magnetic flux in the read side of the shielding 71 tends to jump back across the gap to the write side of the circuit at the points where the forward side read shielding 79 meets the forward side write shielding 77 and the rearward side read shielding 83 meets the rearward side write shielding 81 thus further preventing stray flux from entering the read circuits.

While the invention has been described in conjunction with a specific embodiment thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. In a read-after-write magnetic head having a tape-engaging face:

a. a write magnetic circuit having an inside core piece and an outside core piece, said core pieces defining a write gap within said face of said magnetic head;

b. a read magnetic circuit having an inside core piece and an outside core piece, said core pieces defining a read gap within said face of said magnetic head, said read gap being parallel with respect to said write gap;

c. a cross-feed shield constructed of a highly permeable material and located between said write gap and said read gap, said shield extending parallel with respect to said gaps;

d. a generally flat write flank shield mounted exclusively on said head face constructed of a highly permeable material;

e. said write flank shield located exterior of said write gap for gathering stray flux which may be emitted from said write gap while not interfering with the signal at said write gap;

f. a pair of generally flat end shields constructed of a highly permeable material, said end shields being located exclusively on said head face and between and in contact with said flank shield and said cross-feed shield for gathering stray flux which may be emitted from said write gap, said end shields being spaced apart with said write circuit being between said end shields;

g. whereby, said flank shield, said end shields, and said cross-feed shield cooperate in gathering stray flux which may be emitted from said write circuit thereby preventing said flux from entering said read circuit.

2. The apparatus of claim 1 including:

a. a generally flat read flank shield constructed of a highly permeable material located exclusively on said head face exterior of said read gap; and b. a pair of generally flat read end shields constructed of a highly permeable material, said read end shields being spaced apart with said read circuit being interior, said end shields being located exclusively on said head face between said read flank shield and said cross-feed shield, said read end shields being in contact with said read flank shiled, and separated from said write end shields by a gap and separated from said cross-feed shield.

3. In a read-after-write magnetic head having a tape-engaging face:

a. a write magnetic circuit having an I-shaped inside core piece and an outside core piece, said core pieces defining a write gap within said face of said magnetic head, said outside core piece having a bottom leg, a vertically extending side leg having an outside vertical surface, and a top leg having a top surface, said top surface of said top leg and said vertical surface of said side leg defining a first edge;

b. a read magnetic circuit having an inside core piece and an outside core piece, said core pieces defining a read gap within said face of said magnetic head, said read gap being parallel with respect to said write gap;

c. a cross-feed shield constructed of a highly permeable material and located between said write gap and said read gap, said shield extending parallel with respect to said gaps;

d. a generally flat write flank shield mounted exclusively on said head face constructed of a highly permeable material, said shield having a top surface and a side surface, said side surface and said top surface defining a second edge;

e. said flank shield being located exterior of said write circuit with said second edge being proximate said first edge for gathering stray flux which may be emitted from said write gap; and f. a pair of generally flat end shields constructed of a highly permeable material, said end shields being located exclusively on said head face between and in contact with said flank shield and said cross-feed shield for gathering stray flux which may be emitted from said write gap, said end shields being spaced apart with said write circuit being located between said end shields;

g. whereby, said flank shield, said end shields, and said cross-feed shield cooperate in gathering stray flux which may be emitted from said write circuit thereby preventing said flux from entering said read circuit.

4. The apparatus of claim 3 including:

a. a generally flat read flank shield constructed of a highly permeable material located exclusively on said head face exterior of said read gap; and b. a pair of generally flat read end shields constructed of a highly permeable material, said read end shields being spaced apart with said read circuit being interior, said end shields being located exclusively on said head face between said read flank shield and said cross-feed shield, said read end shields being in contact with said read flank shield, and separated from said write end shields by a gap and separated from said cross-feed shield.

5. In a two-channel read-after-write magnetic head having a tape-engaging face:

a. a pair of spaced apart write magnetic circuits, each of said circuits having an inside core piece and an outside core piece, said inside core piece and said outside core piece for each circuit defining a write gap within the face of said magnetic head, said write gaps being parallel and coplanar;

b. each of said outside core pieces having a horizontally extending bottom leg, a vertically extending side leg having an outside vertical surface, and a horizontally extending top leg having a top surface, said top surface of each of said top legs and said vertical surface of each of said side legs defining a first edge;

c. a pair of spaced apart read magnetic circuits, each of said circuits having an inside core piece and an outside core piece, said inside core piece and said outside core piece of each of said circuits defining a read gap within the face of said magnetic head, said read gaps being parallel and coplanar with respect to each other and parallel with respect to said write gaps;

d. a cross-feed shield constructed of a highly permeable material located between said write gaps and said read gaps and extending parallel with respect to said gaps;

e. a generally flat flank shield mounted exclusively on said head face constructed of a highly permeable material for gathering stray flux which may be emitted from said write gap, said shield having a top surface and a side surface, said side surface and said top surface defining a second edge;

f. said flank shield being located exterior of said write circuits with said second edge being proximate said first edge; and g. a pair of generally flat end shields constructed of a highly permeable material, said end shields being located exclusively on said head face between and in contact with said flank shield and said cross-feed shield for gathering stray flux which may be emitted from said write gap, said end shields being spaced apart with said write circuits being between said end shield, h. whereby, said end shields, said flank shield and said cross-feed cooperate in gathering any stray flux which may be emitted from said write circuit for preventing said flux from being introduced within said read circuit.

6. The apparatus of claim 5 including a cross-talk shield constructed of a highly permeable material located between said write circuits for reducing cross-talk between write circuits and also reducing cross-feed between said write circuits and said read circuits.

7. The apparatus of claim 5 including:

a. a generally flat read flank shield constructed of a highly permeable material located exclusively on said head face exterior of said read pags; and b. a pair of generally flat read end shields constructed of a highly permeable material, said read end shields being spaced apart with said read circuit being interior, said end shields being located exclusively on said head face between said read flank shield and said cross-feed shield, said read end shields being in contact with said read flank shield, and separated from said write end shields by a gap and separated from said cross-feed shield.

* * * * *